US012294486B2

(12) United States Patent
Deshmukh et al.

(10) Patent No.: US 12,294,486 B2
(45) Date of Patent: May 6, 2025

(54) NETWORK CONFIGURATION METHOD AND SYSTEM (71) Applicant: Rakuten Mobile, Inc., Tokyo (JP)

(72) Inventors: Shubham Deshmukh, Madhya Pradesh (IN); Ravi Manaware, Madhya Pradesh (IN); Jayveer Prajapati, Madhya Pradesh (IN); Shubham Rathore, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/798,309

(22) PCT Filed: Jun. 8, 2022

(86) PCT No.: PCT/US2022/032598
§ 371 (c)(1),
(2) Date: Aug. 9, 2022

(87) PCT Pub. No.: WO2023/239357
PCT Pub. Date: Dec. 14, 2023

(65) Prior Publication Data
US 2024/0187304 A1 Jun. 6, 2024

(51) Int. Cl.
*H04L 41/0806* (2022.01)
*H04L 41/0895* (2022.01)
(Continued)

(52) U.S. Cl.
CPC ...... *H04L 41/0806* (2013.01); *H04L 41/0895* (2022.05); *H04L 43/0882* (2013.01); *H04W 64/003* (2013.01)

(58) Field of Classification Search
CPC ............ H04L 41/0806; H04L 41/0895; H04L 43/0882; H04L 43/0876; H04L 43/20;
(Continued)

(56) References Cited

U.S. PATENT DOCUMENTS 11,356,500 B1 * 6/2022 Gupta ................. H04L 67/1001
2001/0032262 A1 10/2001 Sundqvist et al.
(Continued)

FOREIGN PATENT DOCUMENTS

WO WO-2018166379 A1 * 9/2018 ......... H04L 41/0813

*Primary Examiner* — Soe Hlaing
(74) *Attorney, Agent, or Firm* — HAUPTMAN HAM, LLP (57) ABSTRACT A computer-implemented method includes receiving a network configuration request from a site manager, the network configuration request including location information of a site of the network, identifying a geographic domain that includes the network site based on the location information, identifying a server cluster mapped to the geographic domain, determining whether a network function exists in the server cluster and is capable of managing the network, and either using the existing network function to configure the network based on determining that a network function exists in the server cluster and is capable of managing the network, or creating a new network function in the server cluster and using the new network function to configure the network based on determining that no network function exists in the server cluster and is capable of managing the network.

20 Claims, 4 Drawing Sheets (51) Int. Cl.
*H04L 43/0882* (2022.01)
*H04W 64/00* (2009.01)

(58) Field of Classification Search
CPC .. H04L 41/0853; H04W 64/003; H04W 16/18
See application file for complete search history.

(56) References Cited

U.S. PATENT DOCUMENTS

| | | | |
|---|---|---|---|
| 2011/0151886 A1* | 6/2011 | Grayson | H04W 16/04 455/452.1 |
| 2013/0065599 A1* | 3/2013 | Chan | H04W 16/18 455/446 |
| 2018/0100747 A1* | 4/2018 | Greenwood | G01C 21/3694 |
| 2018/0227837 A1 | 8/2018 | Starsinic et al. | |
| 2020/0313983 A1 | 10/2020 | Stammers et al. | |

* cited by examiner

NETWORK CONFIGURATION METHOD AND SYSTEM

RELATED APPLICATIONS

The present application is a National Phase of International Application No. PCT/US2022/032598, filed Jun. 8, 2022.

BACKGROUND

Network functions virtualization (NFV) is a network architecture concept that leverages virtualization technologies to virtualize entire classes of network node functions into building blocks that connect, or chain together, to create and deliver communication services. NFV is based upon traditional server-virtualization techniques such as those used in enterprise information technology (IT). A virtualized network function (VNF) is typically implemented within one or more virtual machines (VMs) or containers running different software and processes, on top of commercial off the shelf (COTS) high-volume servers, switches, and storage devices, or even cloud computing infrastructure, instead of having custom hardware appliances for each network function. The decoupling of the network function software from the customized hardware platform realizes a flexible network architecture that enables agile network management. A Cloud-Native Network Function (CNF) is a software-implementation of a network function, which typically runs inside a Linux container that is traditionally performed by a physical device.

BRIEF DESCRIPTION OF DRAWINGS

Aspects of the present disclosure are best understood from the following detailed description when read with the accompanying figures. In accordance with the standard practice in the industry, various features are not drawn to scale. In fact, the dimensions of the various features are arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows include embodiments in which the first and second features are formed or positioned in direct contact and include embodiments in which additional features are formed or positioned between the first and second features, such that the first and second features are in indirect contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of a system or object in use or operation in addition to the orientation depicted in the figures. The system is otherwise oriented (rotated 90 degrees or at other orientations) and the spatially relative descriptors used herein likewise are interpreted accordingly.

In various embodiments, a method, apparatus, and computer readable medium are directed to automatically receiving, from a site manager, a network configuration request including location information of a site of the network, identifying a geographic domain that includes the network site, identifying a server cluster mapped to the geographic domain, determining whether a network function exists in the server cluster and is capable of managing the network, and based on the determination, either using an existing network function to configure the network, or creating a new network function in the server cluster and using the new network function to configure the network. In some embodiments, the network is an indoor small cells mobile network.

Figure 1:
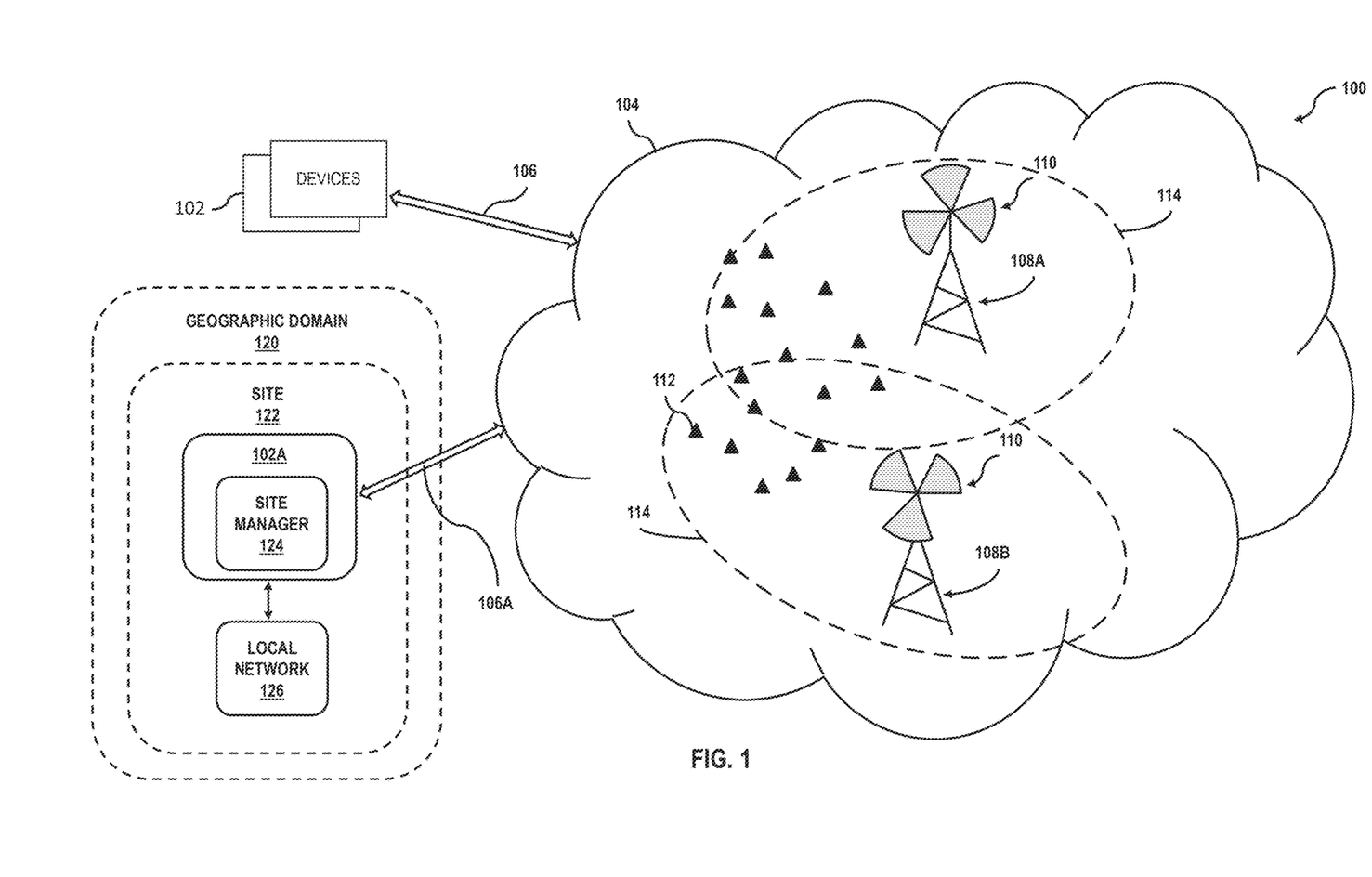
FIG. 1 is block diagram of a communication system, in accordance with some embodiments.

FIG. 1 is a block diagram of a communication system 100 (hereinafter referred to as "system 100"), in accordance with some embodiments.

System 100 includes a plurality of devices 102 coupled to a network 104 by a plurality of links 106. Network 104 is coupled to a device 102A of plurality of devices 102 by a link 106A of plurality of links 106. Plurality of devices 102 including device 102A are coupled to each other through network 104 and plurality of links 106 including link 106A.

Figure 4:
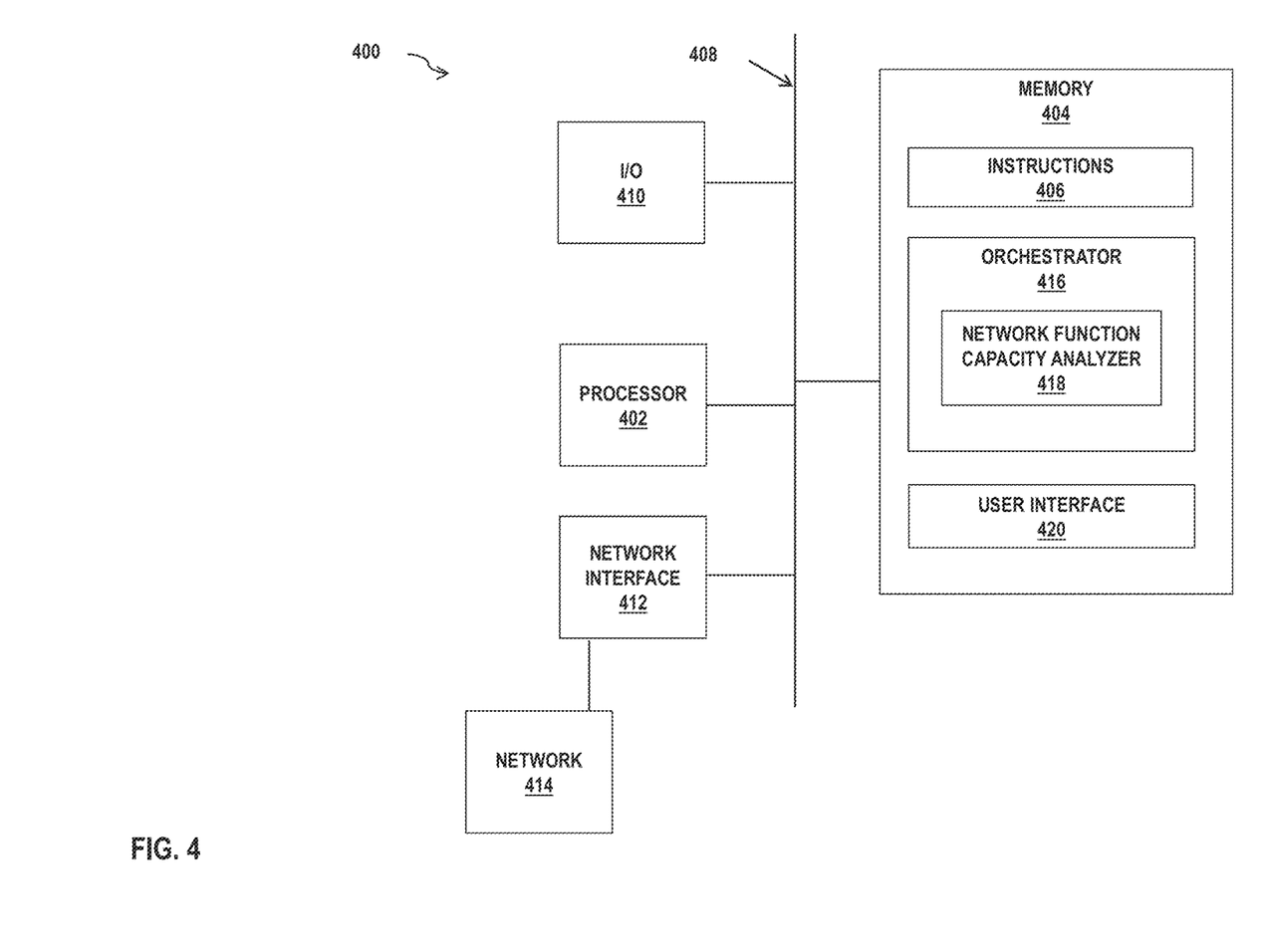
FIG. 4 is a diagram of a network configuration system, in accordance with some embodiments.

In various embodiments, the devices of plurality of devices 102 correspond to combinations of computing devices, computing systems, servers, server clusters, and/or pluralities of server clusters also referred to as server farms or data centers in some embodiments. In some embodiments, a system 400 discussed below with respect to FIG. 4 is an embodiment of one or more of plurality of devices 102.

In some embodiments, one or more of plurality of devices 102 is a type of mobile terminal, fixed terminal, or portable terminal including a desktop computer, laptop computer, notebook computer, netbook computer, tablet computer, wearable circuitry, mobile handset, server, gaming console, or combination thereof. In some embodiments, one or more of plurality of devices 102 includes a display by which a user interface is displayed.

Other configurations and/or types of devices in plurality of devices 102 are within the scope of the present disclosure.

In the embodiment depicted in FIG. 1, device 102A, including a site manager 124, and a local network 126 are located at a site 122 in a geographic domain 120. Geographic domain 120, also referred to as a prefecture 120 in some embodiments, is a geographic region bounded by one or more borders corresponding to political, physical, and/or geometric configurations. In various embodiments, geographic domain 120 is some, all, or a combination of a town, a village, a city, a county, a state, a province, a country, a continent, an island, a peninsula, an isthmus, a grid portion, e.g., bounded by latitude and longitude criteria, a circular, polygonal, or other region, or the like.

Site 122 is a geographically and/or physically limited portion of geographic domain 120, the portion being sufficiently small such that geographic domain 120 is capable of including a plurality of sites including site 122. In various embodiments, site 122 is some, all, or a combination of a building, e.g., a hotel or office building, a building complex, a campus, an industrial park, a city block or blocks, a shopping center, a town center or mall, a neighborhood, a town, a village, or the like.

Network 104 is one or more interconnected devices configured to provide electronic communications between and among the interconnected devices and plurality of devices 102, in some cases through plurality of links 106. In some embodiments, network 104 corresponds to the internet.

In some embodiments, network 104 includes or represents a radio-access network (RAN), a mobile telecommunication system that implements a radio access technology and resides between devices such as mobile phones, computers, or other devices and provides connection with plurality of devices 102.

In some embodiments, one or more of the interconnected devices of network 104 and/or plurality of devices 102 are configured as one or more of a local area network (LAN), a wide area network (WAN), a metropolitan area network (MAN), an internet area network (IAN), a campus area network (CAN), or a virtual private network (VPN). In some embodiments, one or more of the interconnected devices of network 104 and/or plurality of devices 102 are configured as a backbone or core network (CN), a part of a computer network which interconnects networks, providing a path for the exchange of information between different LANs, WANs, etc.

In some embodiments, some of the interconnected devices of network 104 and/or plurality of devices 102 are configured as server clusters, e.g., included in a data center. In some embodiments, the server clusters are part of a cloud computing environment.

In the embodiment depicted in FIG. 1, network 104 includes base stations 108A and 108B (hereinafter base station 108), each including an antenna 110 wirelessly connected to one or more instances of user equipment (UE) 112 located in a geographic coverage area 114.

In some embodiments, network 104 is a global system for mobile communications (GSM) RAN, a GSM/EDGE RAN, a universal mobile telecommunications system (UMTS) RAN (UTRAN), an evolved universal terrestrial radio access network (E-UTRAN, open RAN (O-RAN), or cloud-RAN (C-RAN). In some embodiments, network 104 resides between user equipment 112 (e.g., mobile phone, a computer, or any remotely controlled machine) and one or more core networks.

In some embodiments, network 104 is a hierarchical telecommunications network including one or more intermediate link(s), also referred to as backhaul portions in some embodiments, between a RAN and one or more core networks. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul generally refers to the side of the network that communicates with the global internet. UE 112 communicating with a base station 108 constitute a local subnetwork. In some embodiments, a backhaul includes wired, fiber optic, and/or wireless components including microwave bands and mesh and edge network topologies that use a high-capacity wireless channel to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, a base stations 108 is a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers, transceivers, digital signal processors, control electronics, a remote radio head (RRH), primary and backup electrical power sources, and sheltering. Base stations are known by other names such as base transceiver station, mobile phone mast, or cell tower. In some embodiments, base stations are edge devices configured to wirelessly communicate with UEs. The edge device provides an entry point into service provider core networks. Examples include routers, routing switches, integrated access devices (IADs), multiplexers, and a variety of metropolitan area network (MAN) and wide area network (WAN) access devices.

In at least one embodiment, an instance of antenna 110 is a sector antenna. In some embodiments, an instance of antenna 110 is a type of directional microwave antenna with a sector-shaped radiation pattern. In some embodiments, the sector degrees of arc are 60°, 90° or 120° designs with a few degrees extra to ensure overlap. Further, sector antennas are mounted in multiples when wider coverage or a full-circle coverage is desired. In some embodiments, an instance of antenna 110 is a rectangular antenna, sometimes called a panel antenna or radio antenna, used to transmit and receive waves or data between mobile devices or other devices and a base station. In some embodiments, an instance of antenna 110 is a circular antenna. In some embodiments, an instance of antenna 110 operates at microwave or ultra-high frequency (UHF) frequencies (300 MHz to 3 GHz). In some embodiments, instances of antenna 110 are chosen for their size and directional properties.

In some embodiments, an instance of UE 112 is a computer or computing system. In some embodiments, an instance of UE 112 has a liquid crystal display (LCD), light-emitting diode (LED) or organic light-emitting diode (OLED) screen interface, such as a graphical user interface providing a touchscreen interface with digital buttons and keyboard or physical buttons along with a physical keyboard. In some embodiments, an instance of UE 112 connects to the internet and interconnects with other devices. In some embodiments, an instance of UE 112 incorporates integrated cameras, the ability to place and receive voice and video telephone calls, video games, and Global Positioning System (GPS) capabilities. In some embodiments, an instance of UE 112 performs as a virtual machine or allows third-party apps to run as a container. In some embodiments, an instance of UE 112 is a computer (such as a tablet computer, netbook, digital media player, digital assistant, graphing calculator, handheld game console, handheld personal computer (PC), laptop, mobile internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In various embodiments, a geographic coverage area 114, also referred to as a cell 114 in some embodiments, is a three-dimensional space having a shape and size based on the configurations of the corresponding base station 108, e.g., a power level, and antenna 100, e.g., a number of sectors. In various embodiments, a geographic coverage area 114 has a substantially spherical, hemispherical, conical, columnar, circular or oval disc, or other shape corresponding to a base station and antenna configuration. In various embodiments, one or both of the shape or size of a geographic coverage area 114 varies over time, e.g., based on a variable base station power level and/or a variable number of activated antenna sectors.

In some embodiments, a size of an instance of geographic coverage area 114 is referred to as a range determined by a maximum distance between two points within the instance of geographic coverage area 114. In some embodiments, an instance of geographic coverage area 114 is referred to as a macro-cell based on a range of 1 kilometer (km) to 30 km, a micro-cell based on a range of 200 meters (m) to 2 km, a pico-cell based on a range of 4 m to 200 m, or a femto-cell based on a range of 1 m to 12 m. In some embodiments, a small cell refers to any of a micro-cell, a pico-cell, or a femto-cell. An instance of geographic coverage area 114 represents the geographic area where an antenna 110 and corresponding UEs 112 are configured to communicate.

In some embodiments, a user of network 104, e.g., a user of one of plurality of devices 102, accesses network 104 through a service provider, a business or organization that sells bandwidth or network access by providing direct internet backbone access to internet service providers and usually access to its network access points (NAPs). Service providers are sometimes referred to as backbone providers or internet providers. Service providers consist of telecommunications companies, data carriers, wireless communications providers, internet service providers, and cable television operators offering high-speed internet access.

Plurality of links 106 include hardware configured to enable electronic communications between plurality of devices 102 and network 104. In various embodiments, one or more of plurality of links 106 is a wired link, e.g., fiber optic, shielded, twisted-pair, or other cabling, or a wireless link type.

In various embodiments, one or more of plurality of links 106 is configured to communicate based on code division multiple access (CDMA), wideband CDMA (WCDMA), time division multiple access (TDMA), frequency division multiple access (FDMA), Orthogonal Frequency Division Multiplexing (OFDM), time division duplexing (TDD), frequency division duplexing (FDD), Bluetooth, Infrared (IR), or the like, or other protocols that may be used in a wired or wireless data communications network. Accordingly, the exemplary illustrations provided herein are not intended to limit the embodiments of the disclosure and are merely to aid in the description of aspects of the embodiments of the disclosure.

Local network 126, also referred to as network 126 in some embodiments, is a network including multiple components located at site 122. In some embodiments, the multiple components include computer network hardware, e.g., servers and/or routers, software, and/or physical or administrative domains. In some embodiments, network 126 is a mobile network and the multiple components include cells including base stations and antennae, e.g. cells 114. In some embodiments, the multiple components include micro-cells, pico-cells, and/or femto-cells. In some embodiments, the multiple components are referred to as small cells. In some embodiments, site 122 corresponds to one or more buildings and the multiple components include indoor small cells (IDSCs). In some embodiments, network 126 is referred to as an IDSC network.

Site manager 124 is one or more sets of instructions executed by device 102A and configured to perform organizational and administrative functions related to site 122 and network 126. Site manager 124 is configured to perform various automated functions in response to user input received by device 102A and/or through link 106A.

In the embodiment depicted in FIG. 1, device 102A including site manager 124 is a single instance of plurality of devices 102 located at site 122 in geographic domain 120. In some embodiments, device 102A including site manager 124 includes one or more instances of plurality of devices 102 partially or entirely located outside of site 122 in geographic domain 120 and/or partially or entirely located outside of both site 122 and geographic domain 120.

In the embodiment depicted in FIG. 1, network 126 is configured to communicate with network 104 through device 102A and link 106A. In some embodiments, network 126 is otherwise configured to communicate with network 104, e.g., through a different instance of plurality of links 106.

In response to data included in one or more user inputs, site manager 124 is configured to cause device 102A to output at least one trigger to an orchestrator, e.g., an orchestrator 212 discussed below with respect to FIG. 2. The trigger is an electronic communication including planning data of network 126, e.g., geographic information corresponding to site 122 and/or a number of the multiple components of network 126.

An orchestrator is one or more sets of instructions configured to perform automated configuration, coordination, and management of computer systems and software as related to service-oriented architecture, virtualization, provisioning, converged infrastructure, and dynamic datacenter topics, e.g., by aligning business-based requests with applications, data, and infrastructure of the computer systems and software. In the context of cloud computing, the main difference between workflow automation and orchestration is that workflows are processed and completed as processes within a single domain for automation purposes, whereas orchestration includes a workflow and provides a directed action towards larger goals and objectives. In the cloud computing context, an orchestrator is configured to perform cloud management solutions encompassing frameworks for workflow mapping and management with an overall aim of achieving specific goals and objectives, e.g., by meeting application performance goals using minimized cost and maximized application performance within budget constraints.

Figure 2:
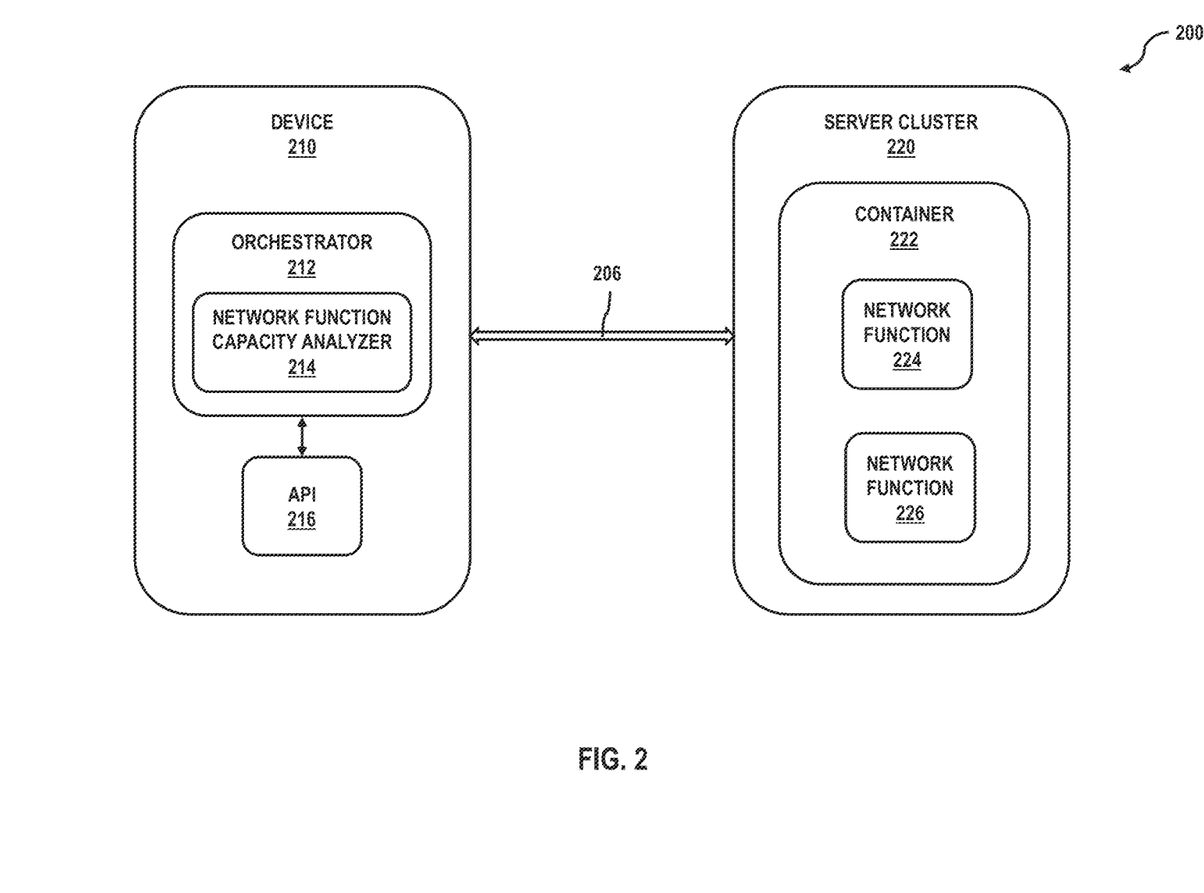
FIG. 2 is a block diagram of a system, in accordance with some embodiments.

FIG. 2 is a block diagram of a system 200, in accordance with some embodiments. FIG. 2 is simplified for the purpose of illustration. System 200 includes a device 210 and a server cluster 220, each of which is an instance of plurality of devices 102 discussed above with respect to FIG. 1. Device 210 is communicatively coupled to server cluster 220 and to network 104 (not shown in FIG. 2 for the purpose of clarity) through at least one link 206, an instance of plurality of links 106 discussed above with respect to FIG. 1.

Device 210, also referred to as orchestrator device 210 in some embodiments, includes orchestrator 212 and an application programming interface (API) 216. Orchestrator 212 further includes a network function capacity analyzer 214, also referred to as analyzer 214 in some embodiments.

Server cluster 220 includes a container 222 configured to run network functions 224 and 226. In some embodiments, server cluster 220 is one server cluster of a plurality of server clusters included in a data center that are not depicted for the purpose of clarity.

Server cluster 220 includes a plurality of servers configured to operate collectively whereby the operational resources of each server of server cluster 220 are available in aggregate for use by software applications and containers running on server cluster 220. Server cluster 220 is configured to operate in association with geographic domain 120 such that the software applications and containers running on server cluster 220 are associated with controlling network and other operations within geographic domain 120. In some embodiments, server cluster 220 is thereby referred to as being mapped to geographic domain 120. In some embodiments, server cluster 220 is considered to be mapped to geographic domain 120 by being included in a data center mapped to geographic domain 120 accordingly.

Container 222, also referred to as virtual machine (VM) 222 in some embodiments, is one or more sets of instructions configured to run on server 220 and in turn enable execution of a plurality of virtualized network functions, including network functions 224 and 226, by functioning as a virtual operating system, also referred to as an image, such that the plurality of virtualized network functions effectively run on server cluster 220.

Each of network functions 224 and 226 is a virtualized network function configured as a control unit capable of controlling one or more networks, e.g., network 126 discussed above with respect to FIG. 1, located in geographic domain 120. In some embodiments, each of network functions 224 and 226 is configured as a control unit capable of controlling one or more mobile networks. In some embodiments, network functions 224 and 226 are referred to as virtualized network functions (VNFs) 224 and 226 or virtualized control units (vCUs) 224 and 226.

In some embodiments, server cluster 220 does not include one of network functions 224 or 226. In some embodiments, server cluster 220 and container 222 are configured to run one or more network functions (not shown) in addition to network functions 224 and 226. In some embodiments, server cluster 220 is configured to run one or more containers or other software applications (not shown) in addition to container 222, e.g., an additional container capable of running additional network functions, the one or more additional containers or other software applications thereby being configured to use operational resources of server cluster 220 in addition to those used by network functions 224 and 226.

Orchestrator 212 is configured to receive one or more communications, also referred to as triggers in some embodiments, from site manager 124 discussed above with respect to FIG. 1. The one or more communications include a network configuration request directed to network 126 and including location information of site 122, each discussed above with respect to FIG. 1.

In some embodiments, the network configuration request includes a number of components of network 126. In some embodiments, network 126 is a small cells mobile network, e.g., an IDSC mobile network, and the network configuration request includes a number of cells of network 126. In some embodiments, the network configuration request includes capacity information corresponding to the components of network 126, e.g., sizes, power levels, antenna configurability, and/or user numbers of cells of network 126.

In some embodiments, the location information of site 122 includes latitude and longitude data of site 122 whereby the geographic location of site 122 is capable of being determined. In some embodiments, the location information of site 122 includes other data whereby the geographic location of site 122 is capable of being determined, e.g., grid or polar coordinate data relative to a reference location such as a city center.

Analyzer 214 is configured to receive the network configuration request from orchestrator 212 or from site manager 124, and output the location information of site 122 to API 216. In some embodiments, analyzer 214 is configured to derive site 122 location information from the location information included in the network configuration request, e.g., by calculating a distance and a direction from a reference location, and output the derived site 122 location information to API 216.

API 216 is at least one geographic API configured to identify geographic domain 120 based on the location information or the derived location information received from analyzer 124. The at least one geographic API is configured to access stored data, e.g., one or more databases, and retrieve at least one identifier, e.g., a name, of geographic domain 120 based on the location information, e.g., latitude and longitude data.

In various embodiments, analyzer 214 is configured to identify geographic domain 120 based on a single identifier received from API 216 or to derive the identity of geographic domain 120 from more than one identifier received from API 216.

From the identity of geographic domain 120, analyzer 214 is configured to identify server cluster 220 as being mapped to geographic domain 120, e.g., by accessing a database (not shown). In some embodiments, analyzer 214 is configured to identify server cluster 220 as being mapped to geographic domain 120 by identifying a data center including server cluster 220 as being mapped to geographic domain 120.

Analyzer 214 is configured to, after identifying server cluster 220 as being mapped to geographic domain 120, determine whether a network function, e.g., network function 224 or 226, exists in server cluster 220 and is capable of managing network 126. In some embodiments, determining whether a network function exists includes accessing a record, e.g., a database record, including server cluster 220 utilization information. In some embodiments, determining whether a network function exists includes receiving server cluster 220 utilization information from orchestrator 212.

Analyzer 214 is configured to, after determining that a network function, e.g., network function 124 or 126, exists in server cluster 220 mapped to geographic domain 120, determine whether the existing network function is capable of managing network 126 by comparing a capacity of the existing network function to the configuration requirements and concluding that the existing network function is capable of managing network 126 based on the capacity of the existing network function being equal to or greater than the configuration requirements.

In some embodiments, analyzer 214 is configured to conclude that the existing network function is capable of managing network 126 based on a number of network components capable of being managed by the existing network function being equal to or greater than a number of network components of network 126. In some embodiments, analyzer 214 is configured to conclude that the existing network function is capable of managing network 126 based on a number of mobile network cells capable of being managed by the existing network function being equal to or greater than a number of cells of network 126.

In some embodiments, analyzer 214 is configured to determine whether the existing network function is capable of managing network 126 by determining a capacity and/or a usage level of server cluster 220, e.g., based on one or more of existing network functions 224 or 226, one or more additional software applications running on server cluster 220, or the aggregate operational resources of server cluster 220.

Analyzer 214 is configured to, based on concluding that the existing network function is capable of managing network 126, map the existing network function to network 126 and use the existing network function to configure network 126.

Analyzer 214 is configured to, based on concluding either that no network function is mapped to geographic domain 120 or that each of one or more existing network functions mapped to geographic domain 120 is not capable of managing network 126, create a new network function in server cluster 220 mapped to geographic domain 120 and use the new network function to configure network 126.

In some embodiments, analyzer 214 is configured to create the new network function based on first determining that server cluster 220 and container 222 are capable of supporting the new network function, e.g., based on the capacity requirements of the new network function and one or more of existing network functions 224 or 226, one or more additional software applications running on server cluster 220, or the aggregate operational resources of server cluster 220. In some embodiments, analyzer 214 is configured to, based on concluding that server cluster 220 and/or container 222 are not capable of supporting the new network function, create the new network function on a server cluster separate from server cluster 220, e.g., another server cluster in a data center mapped to geographic domain 120 and, in some embodiments, including server cluster 220.

In some embodiments, analyzer 214 is configured to create the new network function having capabilities based on the configuration requirements of network 126, e.g., based on a number of cells included in network 126 being an IDSC mobile network.

In the embodiment depicted in FIG. 2, analyzer 214 is a component of orchestrator 212 running on device 210. In some embodiments, analyzer 214 is separate from orchestrator 212. In some embodiments, analyzer 214 runs on a device of plurality of devices 102 other than device 210 on which orchestrator 212 runs.

By the configuration discussed above, communication system 100 including system 200 and analyzer 214 is capable of automatically receiving a network configuration request including location information of a site of the network, and based on the location information, determining whether a network function exists and is capable of managing the network, and either using the existing network function to configure the network or creating a new network function and using the new network function to configure the network. Compared to other approaches, the network is configured more efficiently, and the network functions are more fully utilized such that overall operation of communication system 100 is improved.

Figure 3:
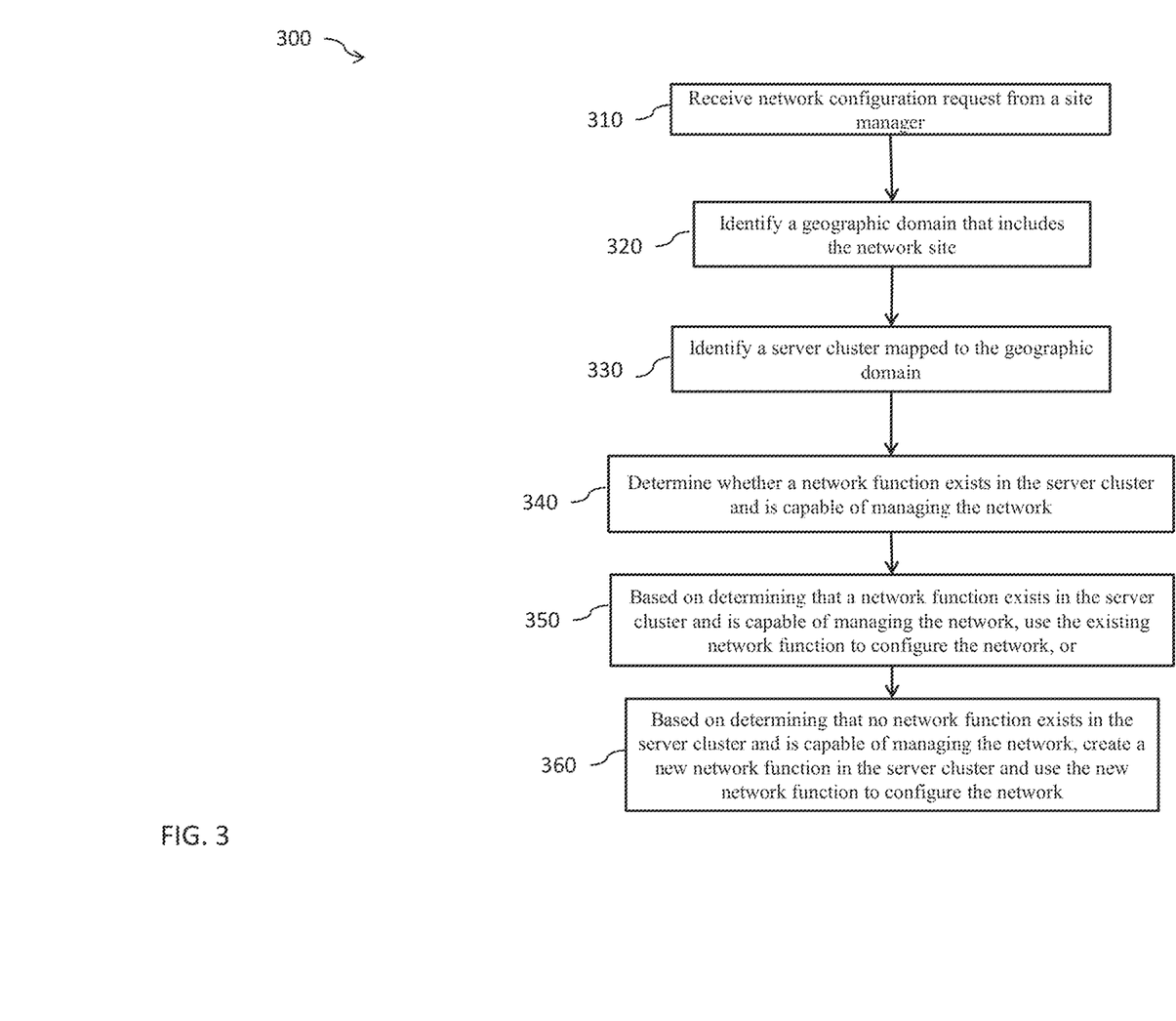
FIG. 3 is a flowchart of a network configuration method, in accordance with some embodiments.

FIG. 3 is a flowchart of a network configuration method 300, in accordance with some embodiments. Method 300 is operable on a communication system, e.g., communication system 100 including system 200 discussed above with respect to FIGS. 1 and 2.

Additional operations may be performed before, during, between, and/or after the operations of method 300 depicted in FIG. 3, and some other operations may only be briefly described herein. In some embodiments, other orders of operations of method 300 are within the scope of the present disclosure. In some embodiments, one or more operations of method 300 are not performed. In some embodiments, the operations of method 300 are included in another method, e.g., a method of operating an orchestrator.

In some embodiments, some or all of the operations of method 300 discussed below are capable of being performed automatically, e.g., by analyzer 214 discussed above with respect to FIGS. 1 and 2 and/or by using processing circuitry 402 discussed below with respect to FIG. 4.

At operation 310, a network configuration request is received from a site manager. Receiving the network configuration request includes analyzer 214 receiving the network configuration request from site manager 124 as discussed above. The network configuration request includes location information of a site of the network, e.g., the location information of site 122 of network 126 discussed above.

In some embodiments, the location information of the site of the network includes latitude and longitude data of the site, and identifying the geographic domain includes accessing an application programming interface using the latitude and longitude data, e.g., accessing API 216 as discussed above.

At operation 320, a geographic domain that includes the network site is identified based on the location information. Identifying the geographic domain includes analyzer 214 identifying geographic domain 120 as discussed above.

At operation 330, a server cluster mapped to the geographic domain is identified. Identifying the server cluster includes analyzer 214 identifying server cluster 220 as discussed above.

At operation 340, it is determined whether a network function exists in the server cluster and is capable of managing the network. Determining whether a network function exists in the server cluster and is capable of managing the network includes analyzer 214 determining whether a network function 224 or 226 exists in server cluster 220 and is capable of managing network 126 as discussed above.

In some embodiments, determining whether a network function is capable of managing the network includes comparing a capacity of the network function to a number of cells of an indoor small cells mobile network, e.g., as discussed above with respect to analyzer 214, network functions 224 and 226, and network 126.

In some embodiments, determining whether a network function is capable of managing the network includes determining a capacity and/or a usage level of the server cluster, e.g., as discussed above with respect to analyzer 214, network functions 224 and 226, and network 126.

At operation 350, based on determining that a network function exists in the server cluster and is capable of managing the network, the existing network function is used to configure the network. Using the existing network function to configure the network includes analyzer 214 using network function 224 or 226 to configure network 126 as discussed above.

In some embodiments, using the existing network function to configure the network includes automatically configuring the network, e.g., using processing circuitry 402 discussed below with respect to FIG. 4.

In some embodiments, using the existing network function to configure the network includes configuring an IDSC mobile network, e.g., network 126 being an IDSC mobile network.

At operation 360, based on determining that no network function exists in the server cluster and is capable of managing the network, a new network function is created in the server cluster and used to configure the network. Creating the new network function and using the new network function to configure the network includes analyzer 214 creating a new network function, e.g., network function 224 or 226 and using the new network function to configure network 126 as discussed above.

In some embodiments, one or both of creating the new network function or using the new network function to configure the network includes automatically creating the new network function and/or configuring the network, e.g., using processing circuitry 402 discussed below with respect to FIG. 4.

In some embodiments, creating the new network function includes configuring the new network function based on a number of cells of the network being an IDSC mobile network, e.g., a number of cells of network 126 being an IDSC mobile network.

In some embodiments, using the new network function to configure the network includes configuring an IDSC mobile network, e.g., network 126 being an IDSC mobile network.

By executing some or all of the operations of method 300, a communication system is capable of automatically configuring one or more networks, e.g., IDSC mobile networks, thereby achieving the benefits discussed above with respect to communication system 100 including system 200.

FIG. 4 is a functional block diagram of a computer or processor-based system 400 upon which or by which an embodiment is implemented.

Processor-based system 400 is programmed to facilitate network application implementation, as described herein, and includes, for example, bus 408, processing circuitry 402, also referred to a processor 402 in some embodiments, and memory 404 components.

In some embodiments, processor-based system 400 includes a communication mechanism such as bus 408 for transferring information and/or instructions among the components of processor-based system 400. Processing circuitry 402 is connected to bus 408 to obtain instructions for execution and process information stored in, for example, memory 404. In some embodiments, processing circuitry 402 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of processing circuitry 402. Similarly, an ASIC is configurable to perform specialized functions not easily performed by a more general-purpose processor. Other specialized components to aid in performing the functions described herein optionally include one or more field programmable gate arrays (FPGA), one or more controllers, or one or more other special-purpose computer chips.

In one or more embodiments, processing circuitry (or multiple processors) 402 performs a set of operations on information as specified by a set of instructions stored in memory 404 related to network application implementation. The execution of the instructions causes the processor to perform specified functions.

Processing circuitry 402 and accompanying components are connected to memory 404 via bus 408. Memory 404 includes one or more of dynamic memory (e.g., RAM, magnetic disk, writable optical disk, or the like) and static memory (e.g., ROM, CD-ROM, or the like) for storing executable instructions that when executed perform the operations described herein to facilitate automated network configuration. Memory 404 also stores the data associated with or generated by the execution of the operations.

In one or more embodiments, memory 404, such as a random-access memory (RAM) or any other dynamic storage device, stores information including processor instructions for facilitating network application implementation. Dynamic memory allows information stored therein to be changed. RAM allows a unit of information stored at a location called a memory address to be stored and retrieved independently of information at neighboring addresses. Memory 404 is also used by processing circuitry 402 to store temporary values during execution of processor instructions. In various embodiments, memory 404 includes a read only memory (ROM) or any other static storage device coupled to bus 408 for storing static information, including instructions, that is not capable of being changed by processing circuitry 402. Some memory is composed of volatile storage that loses the information stored thereon when power is lost. In some embodiments, memory 404 includes a non-volatile (persistent) storage device, such as a magnetic disk, optical disk, or flash card, for storing information, including instructions, that persists even when system 400 is turned off or otherwise loses power.

The term "computer-readable medium" as used herein refers to any medium that participates in providing information to processing circuitry 402, including instructions 406 for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer reads. The term computer-readable storage medium is used herein to refer to a computer-readable medium.

Instructions 407 include an orchestrator 416 including a network function capacity analyzer 418, which correspond to orchestrator 212 and analyzer 214 discussed above with respect to FIGS. 1-3 and are therefore not further discussed. Instructions 407 also include a user interface 420, one or more sets of instructions configured to allow effective operation and control of system 400 by a user. In some embodiments, user interface 420 is configured to operate though one or more layers, including a human-machine interface (HMI) that interfaces machines with physical input hardware such as keyboards, mice, or game pads, and output hardware such as computer monitors, speakers, printers, and other suitable user interfaces.

In some embodiments, a computer-implemented method includes receiving a network configuration request from a site manager, wherein the network configuration request includes location information of a site of the network, identifying a geographic domain that includes the network site based on the location information, identifying a server cluster mapped to the geographic domain, determining whether a network function exists in the server cluster and is capable of managing the network, and either using the existing network function to configure the network based on determining that a network function exists in the server cluster and is capable of managing the network, or creating a new network function in the server cluster and using the new network function to configure the network based on determining that no network function exists in the server cluster and is capable of managing the network.

In some embodiments, an apparatus includes a user interface, a memory having non-transitory instructions stored therein, and a processor coupled to the memory, and being configured to execute the instructions, thereby causing the apparatus to receive a network configuration request from a site manager, wherein the network configuration request includes location information of a site of the network, identify a geographic domain that includes the network site based on the location information, identify a server cluster mapped to the geographic domain, determine whether a network function exists in the server cluster and is capable of managing the network, and either use the existing network function to configure the network based on determining that a network function exists in the server cluster and is capable of managing the network, or create a new network function in the server cluster and use the new network function to configure the network based on determining that no network function exists in the server cluster and is capable of managing the network.

In some embodiments, a computer-readable medium includes instructions executable by a controller of an orchestrator to cause the controller to perform operations including receiving a network configuration request from a site manager, wherein the network configuration request includes location information of a site of the network, identifying a geographic domain that includes the network site based on the location information, identifying a server cluster mapped to the geographic domain, determining whether a network function exists in the server cluster and is capable of managing the network, and either using the existing network function to configure the network based on determining that a network function exists in the server cluster and is capable of managing the network, or creating a new network function in the server cluster and using the new network function to configure the network based on determining that no network function exists in the server cluster and is capable of managing the network.

The foregoing outlines features of several embodiments so that those skilled in the art better understand the aspects of the present disclosure. Those skilled in the art appreciate that they readily use the present disclosure as a basis for designing or modifying other processes and structures for carrying out the same purposes and/or achieving the same advantages of the embodiments introduced herein. Those skilled in the art also realize that such equivalent constructions do not depart from the spirit and scope of the present disclosure, and that they make various changes, substitutions, and alterations herein without departing from the spirit and scope of the present disclosure.

What is claimed is:

1. A method executed by a processor, the method comprising:
   receiving a network configuration request from a site manager at a site of a network, wherein the network configuration request comprises location information of the site of the network;
   based on the location information, identifying a geographic domain that includes the site of the network;
   identifying a server cluster mapped to the geographic domain;
   determining whether a network function exists in the server cluster and is capable of managing the network; and either
      based on determining that a network function exists in the server cluster and is capable of managing the network, using the existing network function to configure the network, or
      based on determining that no network function exists in the server cluster and is capable of managing the network, creating a new network function in the server cluster and using the new network function to configure the network.

2. The method of claim 1, wherein the determining whether a network function is capable of managing the network comprises comparing a capacity of the network function to a number of cells of an indoor small cells mobile network.

3. The method of claim 1, wherein the determining whether a network function is capable of managing the network comprises determining a capacity of the server cluster.

4. The method of claim 3, wherein the determining the capacity of the server cluster comprises determining a usage level of the server cluster.

5. The method of claim 1, wherein the creating the new network function comprises configuring the new network function based on a number of cells of the network being an indoor small cells mobile network.

6. The method of claim 1, wherein the using the existing or new network function to configure the network comprises configuring an indoor small cells mobile network.

7. The method of claim 1, wherein
   the location information of the site of the network comprises latitude and longitude data of the site, and
   the identifying the geographic domain comprises accessing an application programming interface using the latitude and longitude data.

8. An apparatus, comprising: a user interface;
   a memory having non-transitory instructions stored therein; and
   a processor coupled to the memory, and being configured to execute the instructions, thereby causing the apparatus to:
      receive a network configuration request from a site manager at a site of a network, wherein the network configuration request comprises location information of the site of the network;
      based on the location information, identify a geographic domain that includes the site of the network;
      identify a server cluster mapped to the geographic domain;
      determine whether a network function exists in the server cluster and is capable of managing the network; and either
         based on determining that a network function exists in the server cluster and is capable of managing the network, use the existing network function to configure the network, or
         based on determining that no network function exists in the server cluster and is capable of managing the network, create a new network function in the server cluster and use the new network function to configure the network.

9. The apparatus of claim 8, wherein the instructions further cause the apparatus to:
  determine whether a network function is capable of managing the network by comparing a capacity of the network function to a number of cells of an indoor small cells mobile network.

10. The apparatus of claim 8, wherein the instructions further cause the apparatus to:
  determine whether a network function is capable of managing the network by determining a capacity of the server cluster.

11. The apparatus of claim 10, wherein the instructions further cause the apparatus to:
  determine the capacity of the server cluster based on a usage level of the server cluster.

12. The apparatus of claim 8, wherein the instructions further cause the apparatus to:
  create the new network function by configuring the new network function based on a number of cells of the network being an indoor small cells mobile network.

13. The apparatus of claim 8, wherein the instructions further cause the apparatus to:
  use the existing or new network function to configure the network by configuring an indoor small cells mobile network.

14. The apparatus of claim 8, wherein
  the location information of the site of the network comprises latitude and longitude data of the site, and
  the instructions further cause the apparatus to identify the geographic domain by accessing an application programming interface using the latitude and longitude data.

15. A non-transitory computer-readable medium including instructions executable by a controller of an orchestrator device to cause the controller to perform operations comprising:
  receiving a network configuration request from a site manager at a site of a network, wherein the network configuration request comprises location information of the site of the network;
  based on the location information, identifying a geographic domain that includes the site of the network;
  identifying a server cluster mapped to the geographic domain;
  determining whether a network function exists in the server cluster and is capable of managing the network; and either
  based on determining that a network function exists in the server cluster and is capable of managing the network, using the existing network function to configure the network, or
  based on determining that no network function exists in the server cluster and is capable of managing the network, creating a new network function in the server cluster and using the new network function to configure the network.

16. The non-transitory computer-readable medium of claim 15, wherein the instructions are executable by the controller of the orchestrator device to cause the controller to determine whether a network function is capable of managing the network by comparing a capacity of the network function to a number of cells of an indoor small cells mobile network.

17. The non-transitory computer-readable medium of claim 15, wherein the instructions are executable by the controller of the orchestrator device to cause the controller to determine whether a network function is capable of managing the network by determining a usage level of the server cluster.

18. The non-transitory computer-readable medium of claim 15, wherein the instructions are executable by the controller of the orchestrator device to cause the controller to create the new network function by configuring the new network function based on a number of cells of the network being an indoor small cells mobile network.

19. The non-transitory computer-readable medium of claim 15, wherein the instructions are executable by the controller of the orchestrator device to cause the controller to use the existing or new network function to configure the network by configuring an indoor small cells mobile network.

20. The non-transitory computer-readable medium of claim 15, wherein
  the location information of the site of the network comprises latitude and longitude data of the site, and
  the instructions are executable by the controller of the orchestrator device to cause the controller to identify the geographic domain by accessing an application programming interface using the latitude and longitude data.

* * * * *